United States Patent [19]

Nakagome et al.

[11] 3,838,458

[45] Sept. 24, 1974

[54] MAGNETIC TAPE REPRODUCING APPARATUS

[75] Inventors: Makoto Nakagome; Shohgo Takeuchi, both of Kawagoe, Japan

[73] Assignee: Pioneer Electronic Corporation, Tokyo, Japan

[22] Filed: June 7, 1972

[21] Appl. No.: 260,634

[52] U.S. Cl. ............................ 360/93, 242/55.19 A

[51] Int. Cl. ............................................ G11b 5/00

[58] Field of Search ........................... 274/4 B, 11 B; 242/55.19 A, 198; 179/100.2 Z

[56] References Cited

UNITED STATES PATENTS

| | | | |
|---|---|---|---|
| 3,437,762 | 4/1969 | Lear et al. | 179/100.2 Z |
| 3,486,675 | 12/1969 | Krechman | 242/55.19 A |
| 3,492,005 | 1/1970 | Ueno et al. | 274/4 B |

*Primary Examiner*—Leonard D. Christian

[57] ABSTRACT

A retention means for holding a tape cartridge in the play position in a tape player is mounted on a pivoted plate and is urged into engagement with a recess in the side of the cartridge by an elongated helical coil spring of low spring constant. A motor actuation switch is operated by the cartridge during insertion at a point in advance of the play position, so that the tape drive capstan has accelerated to operating speed when the cartridge arrives at the play position.

6 Claims, 4 Drawing Figures

MAGNETIC TAPE REPRODUCING APPARATUS

BACKGROUND OF THE INVENTION

This invention pertains generally to magnetic tape recording and reproducing apparatus and more particularly to such devices of the type utilizing endless tape cartridges held in the play position by a retention means engaging a recess in one side of the cartridge.

In conventional tape players of the above type, the tape cartridge is received in a cartridge channel defined on the bottom by a chassis plate and on the sides by a pair of side plates attached to the chassis plate. One side plate has an opening through which a retention means extends to engage an inclined surface in the cartridge recess. The force applied by the retention means is resolved into a lateral component to seat the cartridge against the opposite side plate and a forward component urging the cartridge toward the transducer and drive capstan. Typically, in the prior art, the retention means comprises a retention roller mounted on one end of a leaf spring, the other end of which is attached to the side plate. The roller is biased through the opening in the side plate into the channel by the leaf spring, so that the roller engages the inclined surface when the cartridge is in the play position. As the cartridge is inserted, the roller is pushed aside by an inclined ramp on the forward corner of the cartridge. The retention roller subsequently rolls along the side of the cartridge until it enters the cartridge recess and engages the inclined surface.

There are two major requirements for an acceptable cartridge retention means. First of all, the retention means must apply a force of predetermined magnitude to the cartridge so that the cartridge is held firmly in the play position. The tolerance range must be held to rather small limits, because too little force allows the cartridge to move about in the player while too much force has an adverse effect upon the relationship between the pinch roller and the drive capstan. In both of these cases the quality of the tape playback is diminished. Secondly, the force that must be exerted by the user to insert or remove the cartridge from the player must be as low as possible, consistent with the force requirements for holding the cartridge properly in the play position. Also, the retention means should have predictable and consistent force characteristics, and it is desirable to have some simple adjustment means to allow compensation for wear manufacturing inaccuracies.

Added to the above requirements is one of low cost, for this is a highly competitive industry. Therefore, while several more sophisticated retention systems, such as electrically operated systems, have been used to overcome the deficiencies of the leaf spring systems, all have been complex and expensive. No doubt, therefore, the prior art has utilized leaf springs to bias the retention rollers because of their low cost and the ease by which they can be packaged in the tape player. However, leaf springs offer a number of disadvantages. It is difficult to economically manufacture springs having the necessary consistently predictable force characteristics. Therefore, the force applied by a particular leaf spring may not be within acceptable limits. Since firm seating of the cartridge is of paramount concern, the tendency is thus to design a spring more powerful than is necessary, so that even those at the lower tolerance limits will provide sufficient force.

The force required to move a spring against its force action, that is, laterally to the direction of force in the case of a leaf spring or in tension or compression in the case of a coil spring, is expressed in terms of the spring constant. Within the operating range of a spring, the spring constant is simply expressed as a function of the force applied to the spring divided by the resultant displacement of the spring. Simply stated, within the operating limits of the spring, the displacement is substantially proportional to the force applied, the proportion being in accordance with a known constant. These constants are different for each type of spring. The spring displacement necessary in a tape player is the distance between the at rest position of the retention roller with no cartridge present in the player, and its position when engaging the side of the cartridge during insertion or removal. The position of the retention roller when engaging the cartridge recess is intermediate these two positions.

To provide the seating force required in a conventional cartridge tape player, a leaf spring must have a high spring constant. As a consequence, the force necessary to displace the leaf spring to insert or remove the cartridge is also high. Since the force required increases as the amount of displacement increases, if a cartridge is of greater than optimum width, the acquired displacement force is proportionally greater.

Furthermore, it is difficult to provide a means for adjusting a leaf spring to compensate for wear or manufacturing inaccuracies. The leaf spring can be bent or otherwise manually repositioned, but such manipulations are themselves inaccurate and unpredictable, and it is difficult to accomplish the slight adjustments usually required.

In the prior art devices it is common to operate a switch that activates the electrical components of the player, particularly the drive motor, by the act of inserting the tape cartridge. Conventionally this switch is operated by the tape cartridge when it arrives in the play position. In such an arrangement, the drive capstan and motor flywheel accelerate to operating speed while in engagement with the tape. The sound reproduction thereby suffers, and the time period during which the acceleration to operating speed occurs is lengthened by the tape drag.

SUMMARY OF THE INVENTION

The object of this invention is to eliminate the deficiencies in prior art players set forth above. The retention means in the inventive device comprises a retention roller mounted upon a pivoted plate, which is urged in the required direction by a coil spring attached between the pivoted plate an an anchor point on the player chassis. The coil spring is of elongated length and has a low spring constant. Thereby, while the force applied to the cartridge when seated in the play position is within the required range, the force necessary to displace the spring the required amount during insertion and removal of the cartridge from the player is less than is necessary in prior art systems, such as those employing leaf springs. Furthermore, coil springs of this type, having very precise and consistent characteristics, can be economically manufactured. Since the spring constant of such a spring is low, the extra force necessary when using a cartridge having greater than optimum width is correspondingly low.

Compensation for wear or manufacturing inaccuracies in the necessary amounts can easily be made to a coil spring of this type by simply adjsuting its initial length. Thus, it is necessary only to provide a plurality of spaced spring attachment points for one end of the spring.

Another feature of this invention assures that the amount of time during which the tape is moved by the capstan at less than optimum speed is minimized. This is accomplished by activating the electrical system, particularly the capstan drive motor, at some predetermined point in advance of the arrival of the cartridge in the play position. The electrical system activation switch is operated by a cam that is engaged by the cartridge during insertion at a point sufficiently in advance of the play position as to allow the flywheel and the drive capstan to accelerate to operating speed before engaging the tape.

DESCRIPTION OF THE PREFERRED EMBODIMENT

Figure 1:
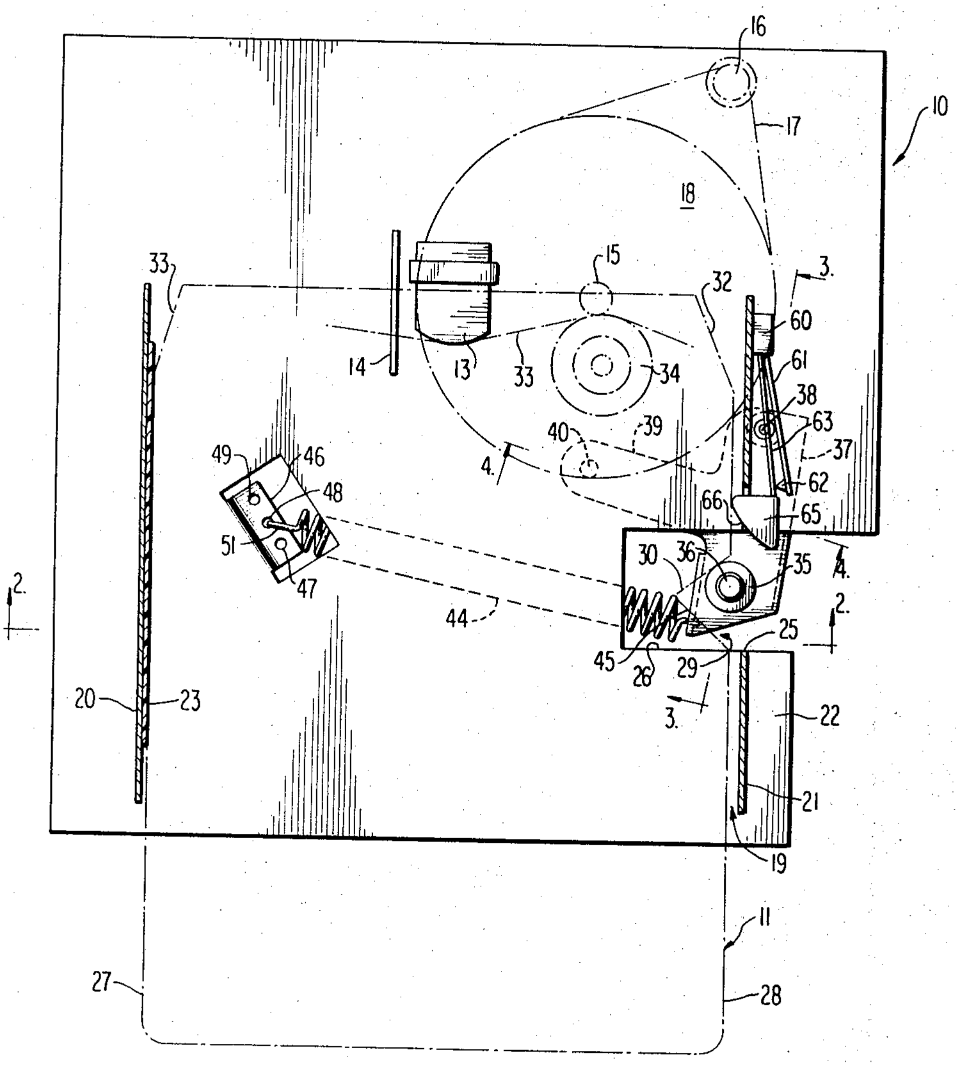
FIG. 1 is a top view, partially in section, of a tape player embodying the retention means and switching means of this invention.

This invention relates to tape recording and reproducing apparatus, commonly referred to as tape players, utilizing cartridges of the endless tape variety. Such cartridges have in one side a recess that is engaged by a retention member on the player chassis to hold the cartridge firmly in the play position.

Such a tape player conventionally consists of a chassis 10 within which are packaged the essential elements and circuitry, utilizing a tape cartridge 11. Mounted on the player chassis 10 are a transducer 13, a tape guide 14, and a drive capstan 15. An electric motor (not shown) rotates a drive shaft 16, which by means of a flexible belt 17 drives a flywheel 18. Drive capstan 15 is mounted at the center of flywheel 18. Transducer 13, tape guide 14, and drive capstan 15 are positioned at the inner end of a cartridge receiving channel 19, which is defined by the chassis top plate 22 and a pair of upstanding side plates 20 and 21. Attached to the inside of side plate 20 is an insert 23 of material having a low coefficient of friction. Side plate 21 has a side plate opening 25, through which protrude the retention means and switch actuation means, described below. Chassis plate 22 has a chassis plate opening 26 through which the retention means also extends.

The conventional endless tape cartridge 11 is of generally quadratic form, comprising a pair of cartridge side walls 27 and 28. Cartridge side wall 28 has at an intermediate position a V-shaped recess or notch 29 which has an inclined surface 30. To facilitate insertion of cartridge 11 into channel 19, the forward corners of cartridge 11 have inclined ramps 32 and 33. Ramp 32 has the additional function of displacing the cartridge retention means during the act of inserting the cartridge. Mounted within cartridge 11 on a single reel (not shown) is the endless tape, only a portion 33 of which is shown. Also mounted within the cartridge is a fixed pinch roller 34, usually having a rubber surface. When tape cartridge 11 is in the play position, as shown in FIG. 1, tape 33 passes through tape guide 14 and contacts the surface of transducer 13. Tape 33 is pinched between drive capstan 15 and pinch roller 34, and rotation of drive capstan 15 causes the tape to be transported.

The retention means of this invention comprises a retention roller 35, which engages inclined surface 30 of cartridge 11. Retention roller 35 is rotatably mounted on a shaft 36 that is affixed to a pivot plate 37. While a roller 35 has been shown, other types of retention elements can be used. Roller 35 is mounted at one end of a pivot plate 37. At the other end of pivot plate 37 there is a pivot connection 38, by which pivot plate 37 is attached to chassis plate 22.

Figure 2:
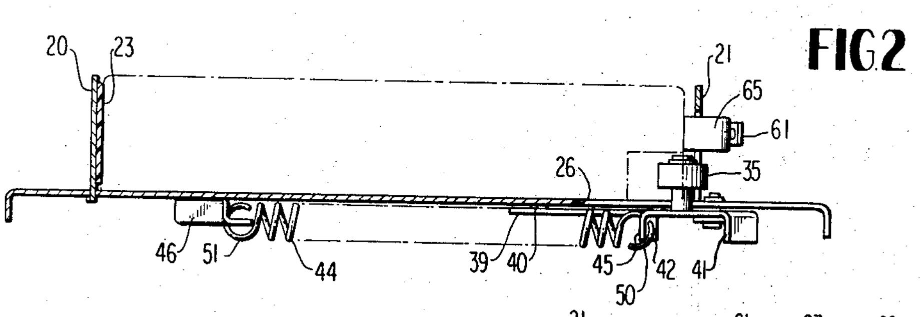
FIG. 2 is an elevational view, partially in section, of the device taken along a line 2—2 of FIG. 1.
Figure 4:
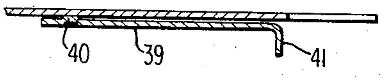
Figure 3:
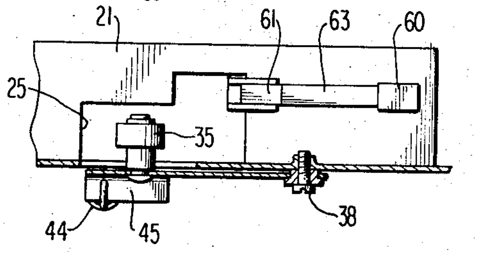
FIG. 3 is an elevational view, partially in section, taken along a line 3—3 of FIG. 1; and, FIG. 4 is an elevational view, partially in section, taken along a line 4—4 of FIG. 1.

Pivot connection 38 is advantageously outside of channel 19. Pivot plate 37 is positioned beneath chassis plate 22, and retention roller 35 protrudes upwardly through chassis plate opening 25. Pivot plate 37 has an arm 39 that extends beneath chassis plate 22, and upon the top of arm 39 is a protuberance 40, the function of which is to reduce the frictional contact between pivot plate 37 and the underside of chassis plate 22. As shown in FIG. 2, pivot plate 37 is strengthened by a pair of downwardly extending flanges 41 and 42.

Retention roller 35 is urged into channel 19 by the action of an elongated helical coil spring 44 of the type having a low spring constant. Flange 42 has a spring anchor opening 45 and chassis plate 22 is provided with a downwardly extending flanged portion 46, which has a plurality of spring anchor openings 47, 48 and 49. Spring 44 is connected by means of a first hook 50 to opening 45, and is connected to one of openings 47, 48 and 49 by means of a second hook 51. The initial length of the spring 44 can be varied by virtue of the plural anchor openings 46, 47 and 48. A stop can be provided to engage pivot plate 37 to limit the extent of movement of roller 35 into channel 19.

The relationship between the longitudinal axis of spring 44, roller 35 and pivot connection 38 is important, and can be established by a number of factors, such as the packaging of the retention means components within the player, and the force resolution desired. In the preferred embodiment of the invention pivot connection 38 is outside of channel 19 and spring 44 is attached to pivot plate 37 at a point adjacent the terminus of the free end. Roller 35 is also mounted adjacent to the terminus of the free end of pivot plate 37, so that the force applied by spring 44 is allowed the greatest possible mechanical advantage. The longitudinal axis of spring 44 is substantially perpendicular to the radius between the axis of pivot connection 38 and roller 35 so that the force of spring 44 is applied to pivot plate 37 in the most efficient manner. Spring 44 is of elongated length, and is best accommodated beneath the bottom of channel 19. By placing friction reducing protuberance 40 on arm 39, spaced from the main portion of pivot plate 37, a minimum of contact between pivot plate 37 and the underside of chassis plate 22 is assured.

A switch means 60 is mounted on the outside of channel side plate 21, and is connected to the electrical circuitry of the tape player, particularly to the drive motor for shaft 16, by conventional means, not shown. Protruding from switch 60 is a fixed switch element 61 which has on its free end a contact 62. Also protruding from switch 60 is a movable switch element 63 which has on its free end a cam 65 with a cam surface 66. Movable switch element 63 is advantageously a single spring biased into channel 19. Cam 65 thus protrudes into cartridge tunnel 19 through side plate opening 25 when no cartridge is present. When movable switch element 63 is moved into engagement with contact 62, switch 60 is closed and the electrical components of the player are activated. This occurs when cam surface 66 is engaged by cartridge side 28.

The spacing of cam 65 is from the end of the travel of cartridge 11 and is an important feature of this invention. Cam 65 is spaced a predetermined distance from capstan 15, this distance being selected so as to insure that switch 60 is closed before cartridge 11 arrives in the play position. The time interval depends upon the length of time it takes for capstan 15 to be accelerated to operating speed. Therefore, when cartridge 11 arrives at the play position, where tape 33 is pinched between pinch roller 34 and the rotating drive capstan 15, tape 33 is almost instantaneously moved at operating speed.

The operation of the device is as follows: In its at rest position, with no cartridge present in cartridge channel 19, retention roller 35 is biased by spring 44 into channel 19 a distance sufficient to accommodate all cartridges having widths within the acceptable tolerances. In other words, retention roller 35 must be able to properly engage inclined surface 30 on any cartridge 11 of acceptable width. Cam 65 also extends into channel 19 a distance sufficient to engage cartridges with widths within the acceptable manufacturing tolerances.

As cartridge 11 is inserted into channel 19, corner ramp 32 engages roller 35 and displaces roller 35 outwardly. At this initial contact of corner ramp 32 and roller 35, cartridge 11 will be urged laterally, so that cartridge side 27 contacts friction surface 23. As insertion of cartridge 11 continues, roller 35 moves along corner ramp 32 until it engages cartridge side 28. Roller 35 is now at its maximum displacement. In a like manner, cam surface 66 is engaged by corner ramp 32, and is also urged outwardly until it engages cartridge side 28, at which point switch element 63 touches contact 62 to close switch 60 and thereby energize the electrical components of the tape player. Specifically, drive shaft 16 begins to drive flywheel 18 and drive capstan 15 in rotation. During the final stages of cartridge insertion, retention roller 35 engages inclined surface 30 and thereupon cartridge 11 is seated in the play position.

The act of removing cartridge 11 initially causes roller 35 to be displaced outwardly by inclined surface 30, then to engage cartridge side 28 and finally ramp 32. As the cartridge is withdrawn, cam surface 66 engages ramp 32 and is then allowed to flex outwardly. At this point switch 60 is opened and the electrical components are deenergized.

Obviously, many modifications and variations of the above described invention will become apparent to one skilled in the art. However, it should be understood that the invention is not to be limited to the above described preferred embodiment, but is governed only by the scope of the appended claims.

We claim:

1. A magnetic tape reproducing apparatus having a cartridge receiving channel defined by a chassis plate and at least one upstanding side plate attached to said chassis plate and utilizing a tape cartridge having a recess in one side engageable by a cartridge retention means mounted on the apparatus to hold the cartridge in the play position in the channel in engagement with a transducer and a tape drive capstan, said retention means comprising:

a pivot plate pivotally mounted on said apparatus adjacent to said channel and on the opposite side of said chassis plate from said channel, a retention roller mounted on said pivot plate for movement into said channel to engage said recess, said chassis plate having an opening through which said retention roller extends, an elongated helical coil spring having a low spring constant connected between said pivot plate and said chassis plate to urge said retention roller into said channel, said coil spring being mounted on the opposite side of said chassis plate from said channel; and adjustment means for attaching said coil spring to said chassis plate to permit adjustment of the length of said coil spring.

2. Magnetic tape reproducing apparatus according to claim 1 wherein the pivot axis of said pivot plate is outside of said channel.

3. Magnetic tape reproducing apparatus according to claim 1 wherein the longitudinal axis of said coil spring is substantially perpendicular to the radius between the pivot axis of said pivot plate and said retention roller.

4. Magentic tape reproducing apparatus according to claim 1 further comprising switch means for energizing said tape drive capstan, said switch means comprising:

a switch having a fixed element and a movable element engageable with said fixed element to close said switch, said movable element normally being biased away from said fixed element, and cam means connected to said movable element and normally protruding into said channel to be displaced by said cartridge during insertion of said cartridge into said channel to move said movable element into engagement with said fixed element, said cam means being so spaced from said capstan as to cause said switch to be closed sufficiently prior to the arrival of said cartridge in said play position to allow said drive capstan to accelerate to operating speed by the time said cartridge arrives in said play position.

5. A magnetic tape reproducing apparatus having a cartridge receiving channel defined by a chassis plate and at least one upstanding side plate attached to said chassis plate and utilizing a tape cartridge having a recess in one side engageable by a cartridge retention means mounted on the apparatus to hold the cartridge in the play position in the channel in engagement with a transducer and a tape drive capstan, said retention means comprising:

a pivot plate pivotally mounted on said apparatus adjacent to said channel and on the opposite side of said chassis plate from said channel, a retention roller mounted on said pivot plate for movement into said channel to engage said recess, said chassis plate having an opening through which said retention roller extends, an elongated helical coil spring having a low spring constant connected between said pivot plate and said apparatus to urge said retention roller into said channel, and friction reducing means interposed between said pivot plate and said chassis plate.

6. Magnetic tape reproducing apparatus according to claim 5 wherein said friction reducing means is mounted on an arm extending outwardly from said pivot plate substantially perpendicular to the pivot axis of said pivot plate.

* * * * *